(12) United States Patent
Gross et al.

(10) Patent No.: US 12,072,437 B2
(45) Date of Patent: Aug. 27, 2024

(54) RADAR INTER-PULSE DOPPLER PHASE GENERATION USING PERFORMANT BOUNDING VOLUME HIERARCHY MICRO-STEP SCENE INTERPOLATION

(71) Applicant: GM CRUISE HOLDINGS LLC, San Francisco, CA (US)

(72) Inventors: Joel Gross, Irvine, CA (US); Michael Hamilton, San Diego, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 438 days.

(21) Appl. No.: 17/555,414

(22) Filed: Dec. 18, 2021

(65) Prior Publication Data

US 2023/0194658 A1    Jun. 22, 2023

(51) Int. Cl.
  *G01S 7/40* (2006.01)
  *G01S 7/41* (2006.01)

(52) U.S. Cl.
  CPC ............ *G01S 7/40* (2013.01); *G01S 7/406* (2021.05); *G01S 7/412* (2013.01); *G01S 7/415* (2013.01); *G01S 7/417* (2013.01)

(58) Field of Classification Search
  CPC .......... G01S 7/4052; G01S 7/40; G01S 7/497; G01S 7/418; G01S 7/417; G01S 13/9094; G01S 13/931; G09B 9/54; G09B 9/40; G09B 9/042; G06F 30/20
  See application file for complete search history.

(56) References Cited

U.S. PATENT DOCUMENTS

| | | | |
|---|---|---|---|
| 4,450,447 A * | 5/1984 | Zebker .................. | G01S 7/4052 342/25 R |
| 2020/0111382 A1* | 4/2020 | Sarabandi ............... | G01S 7/415 |
| 2021/0224436 A1* | 7/2021 | Camps Raga .......... | G06F 30/20 |
| 2021/0406562 A1* | 12/2021 | Holzinger ............. | G06F 30/331 |
| 2022/0057484 A1* | 2/2022 | Jones ..................... | G01S 7/4052 |
| 2022/0099798 A1* | 3/2022 | DeMarco .............. | G01S 7/4052 |
| 2022/0179043 A1* | 6/2022 | Vook ........................ | G01S 7/40 |

* cited by examiner

*Primary Examiner* — Olumide Ajibade Akonai (57) ABSTRACT

The present disclosure is directed to simulating patterns of reflected radar energy off of reference objects using motion data associated with these reference objects. This motion data may identify start times, start locations, end times, and end locations of a limited number reference objects in a set of discrete scenes. Each of these discrete scenes may also have a same time duration. Motion of these specific objects between a start time and an end time of each discrete scene may be interpolated. Once the locations of the objects are interpolated for a given scene, simulations may be performed to estimate the appearance of reflected radar signals that would be received by a radar apparatus. These simulations may identify patterns of reflected radar energy after radar signals have been emitted from the radar apparatus and these patterns may then be provided to train a machine learning apparatus.

21 Claims, 5 Drawing Sheets

RADAR INTER-PULSE DOPPLER PHASE GENERATION USING PERFORMANT BOUNDING VOLUME HIERARCHY MICRO-STEP SCENE INTERPOLATION

BACKGROUND

1. Technical Field

The disclosed technology is directed to improvements of radar systems. More specifically the present disclosure is directed to using simulated radio detection and ranging (radar) data to improve operation of a radar apparatus.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide safe and efficient transportation. Such tasks may require the collection and processing of large quantities of data using various sensor types, including but not limited to cameras, Light Detection and Ranging (LiDAR) sensors, and/or radar elements disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

The present disclosure is directed to simulating patterns of reflected radar energy off of reference objects using motion data associated with these reference objects. This motion data may identify start times, start locations, end times, and end locations of a limited number of reference objects in a set of discrete scenes. Each of these discrete scenes may also have a same time duration. Motion of these specific objects between a start time and an end time of each discrete scene may be interpolated. Once the locations of the objects are interpolated for a given scene, simulations may be performed to estimate the appearance of reflected radar signals that would be received by a radar apparatus. These simulations may identify patterns of reflected radar energy after radar signals have been emitted from the radar apparatus and these patterns may then be provided to train a machine learning apparatus.

Some radar simulators require the use of many processing cycles because their design generates simulated return signals by performing computations associated with elements included in an entire scene. When a simulator is directed to simulating reflected radar signals using Doppler phase shifts, the simulator may identify phase shifts associated with signals that have been reflected off of all objects in a scene. In order to perform such simulations, phase coherent return signals for each of a set of pulses in a transmitted radar pulse stream have to be evaluated. To continue the simulation, once a first set of simulated radar data has been generated, the simulation process has to be performed again and again iteratively. This involves re-rendering the full scene at the pulse rate and requires performing calculations to identify reflected radar data in a move-shoot-move approach that spans upwards of hundreds of very closely spaced time steps. This is very costly in terms of computational time.

Here, sets of pulses of an emitted radar may be spaced a few microseconds apart and each of these sets of pulses may include hundreds of individual distinct radar returns. As mentioned above, the re-rending of simulations for such pulse trains is very compute intensive in part because of the number of transmitted radar pulses and in part because of each of these transmitted radar pulses being associated with many different reflected radar pulses. The sheer number of computations required to simulate operation of a radar makes these techniques impractical for collecting radar reflection data that can be provided to train a machine leaning (ML) process or an artificial intelligence (AI) system quickly.

What is needed are new methods and systems that can generate simulate operation of a radar that receives radar energy that has been reflected off of objects more quickly and in a more affordable way (e.g., in terms of computational resources).

Methods and apparatus consistent with the present disclosure may perform interpolations to produce micro-steps in a performant way. These methods may be applied at an object level or they may be applied at a higher resolution where motions of different parts of a single object are used to generate simulated radar reflection data.

Methods described herein may be in the form of an interpolation framework that creates coherent measurements for each pulse over a series of pulses (i.e., a pulse train). Each interpolated time point will correspond to a pulse in a coherent processing interval (CPI). At each time point the coherent range measurement may be calculated, and each of these range measurements may have an associated phase. These measurements may be stored over the CPI and then these measurements may then be used to calculate Doppler velocity with phase measurement techniques (e.g., a Fourier transform) over the pulses to convert the phase changes to Doppler frequencies corresponding to velocities.

Essentially, these methods may include blurring techniques that will allow an overall simulation to propagate using timesteps of a frame rate. For example, using timesteps of about 100 milliseconds (ms) as opposed to timesteps at the pulse rate that may be less than 100 microseconds (us) to greatly accelerate the runtime of an overall simulation.

Data provided to the simulation may be computer generated, may have been collected using data sensed from the real-world, or may include a combination of computer generated and real-world data. Simulations performed may be associated with the movement of virtually any object (e.g., a person, a vehicle, or an animal) of any size.

The movement data associated with each of a set of discrete scenes may be associated with the movement of an object toward or away from a location of a virtual radar apparatus. The data may include representations of the object moving in a straight line (i.e., in a linear direction), along a point of rotation, or both in a linear and rotational direction.

Data provided to or accessed by a processor performing a simulation of reflections of emitted radar signals may be stored in a datastore. A data structure used to store this data may be in the form of a bounding volume hierarchy (BVH). This BVH data may include data that associates an object or portions of that object with a set of start and ending locations, where each start and ending location corresponds to a particular scene that begins at a respective start time and that ends at a respective end time. Here, the simulator may perform simulations only for certain specific selected or identified reference objects located in a scene. This means that simulations may be performed using one or a few objects instead of many objects that appear in the scene. Limiting simulations only to specific objects in the scene allows simulations to run much faster than simulations designed to evaluate locations of all objects in a scene because a number of calculations required to perform a simulation is drastically reduced based on the reduction of the number of objects.

As mentioned above, some objects may include different parts where each of the respective parts of those objects may be associated with a specific starting location and an ending location. Table 1 illustrates a set of data that may be part of a BVH. The data of table 1 shows movement data associated with two different objects over a span of three different scenes. Here scene number one has a start time of zero and an end time of ten milliseconds (ms), scene number two has a start time of 10 ms and an end time of 20 ms, and scene number three has a start time of 20 ms and an end time of 30 ms. Each of the respective scenes are sequential in time and each of the objects and object part numbers of each of the scenes are associated with respective start and end locations. Such a series of scenes may be referred to as a scene-scenario.

The data of table 1 includes a first object number (object number 1) that has two different parts 1/1 (object 1/part 1) and 1/2 (object 1/part 2). Object number 2 shown in table 1 only includes one part 2/1 (object 2/part 1).

An object that has two or more parts may be a person, where a first part may be a torso of the person and where other parts of the person may include a left leg, a right leg, a left arm, a right arm, and a head of the person. In another example, a car may include a first part of a car body and a second part of a car door.

The data of table 1 shows each object and each part of each object being evaluated in the simulation. Start and ending locations of each object or each object part are identified using dimensions in three-dimensional space using an X coordinate, a Y coordinate, and a Z coordinate for each of three scenes (scene 1, scene 2, and scene 3). This location data may be relative to a location of a radar of an autonomous vehicle.

This location data also shows that object number 2 does not move in scene number two. The data of table 2 may be reviewed to identify whether an object or a part of an object has moved in the scene. The start location and the end location of an object or an object part changes in a scene, that object or object part has moved in the scene. Movement of both part one and part two of object 1 in scene 1 can be identified based on changing start and end locations in the first two rows of table 1. Note that object number 2 moved from location X3, Y3, Z3 to location X6, Y6, Z6 during scene number 1. In some embodiments, the end location of a previous scene corresponds to a start location of a current scene. For example, end location X6, Y6, Z6 of object number 2 in scene number 1 is the same location as the start location of object number 2 in scene number 2.

The data of table 1 may be used to identify whether an object or object part has not moved during a scene. For example, when a start location and an end location of a given object or object part for a given scene are the same, that object or object part has not moved during that given scene. Here again these motions may be relative to a location of a radar apparatus at an autonomous vehicle. Note that in scene number 2, object number 2 remains in location X6, Y6, Z6.

TABLE 1

Object Scene Movement Data

| Scene Number | Scene Start Time | Scene End Time | Object Number | Object/Part Number | Start Location | End Location |
| --- | --- | --- | --- | --- | --- | --- |
| 1 | 0 | 10 ms | 1 | 1/1 | X1, Y1, Z1 | X4, Y4, Z4 |
| 1 | 0 | 10 ms | 1 | 1/2 | X2, Y2, Z2 | X5, Y5, Z5 |
| 1 | 0 | 10 ms | 2 | 2/1 | X3, Y3, Z3 | X6, Y6, Z6 |
| 2 | 10 ms | 20 ms | 1 | 1/1 | X4, Y4, Z4 | X7, Y7, Z7 |
| 2 | 10 ms | 20 ms | 1 | 1/2 | X5, Y5, Z5 | X8, Y8, Z8 |
| 2 | 10 ms | 20 ms | 2 | 2/1 | X6, Y6, Z6 | X6, Y6, Z6 |
| 3 | 20 ms | 30 ms | 1 | 1/1 | X7, Y7, Z7 | X12, Y4, Z4 |
| 3 | 20 ms | 30 ms | 1 | 1/2 | X8, Y8, Z8 | X9, Y9, Z9 |
| 3 | 20 ms | 30 ms | 2 | 2/1 | X6, Y6, Z6 | X10, Y10, Z10 |

Figure 1:
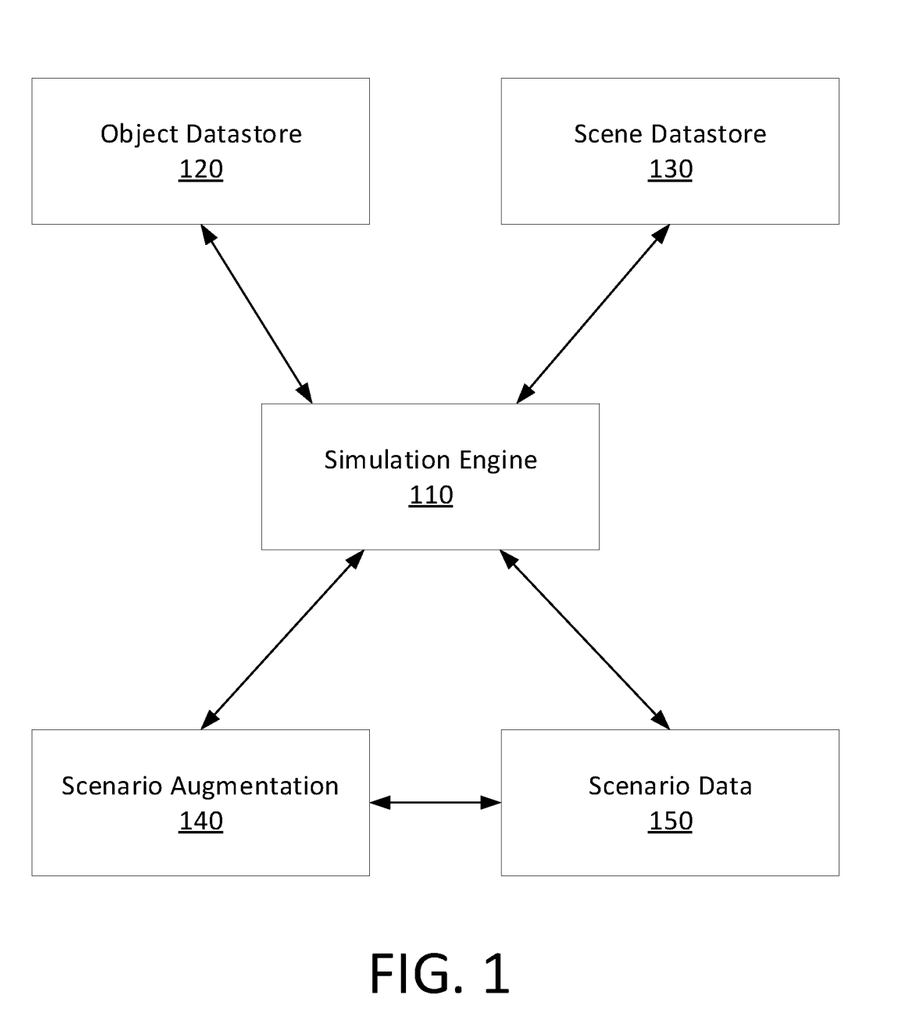
FIG. 1 illustrates sets of stored data that may be accessed by a processor executing functions of a radar simulation that limits computations by simulating the effects of radar energy that has been reflected off of a controlled number of objects, according to some aspects of the disclosed technology.

FIG. 1 illustrates sets of stored data that may be accessed by a processor executing functions of a radar simulation that limits computations by simulating the effects of radar energy that has been reflected off of a controlled number of objects. FIG. 1 includes a simulation engine 110 that may include a processor that executes instructions of a simulation out of a memory. FIG. 1 also includes object datastore 120, scene datastore 130, scenario augmentation data 140, and scenario data 150. Object datastore 120 may include data that describes the motion of individual sets of objects and possibly motion data associated with parts of certain objects. The data stored in object datastore 120 may be a database that stores data that was collected by monitoring the motion of real objects, may have been collected based on a simulation of movement of an object, or a combination of both. Exemplary objects include, a car, a truck, a pedestrian, a person riding a bicycle, a lamp post, an animal (e.g., deer, dog, cat, elephant, or other), a tree, or other object that may be found near or on a roadway.

Scene datastore 130 may be a database that stores data associated with a scene. Scene data may be any data associated within a vicinity around a vehicle. Scene data may include data associated with a multi-lane highway, data associated with driving in a city, or data associated with driving specific types of roadways in specific weather conditions. Scene data may also include objects that will not be used in a radar simulation. For example, a scene may include objects for which reflections of radar signals are not simulated.

Scenario augmentation data 140 may be data that is provided by a user or selected by a user. For example, a user could select a set of objects from the object datastore 120 to place at specific locations in a scene before a simulation is performed. A user could select to place a person riding a bicycle at a first location of the scene and could select to place a person pushing a baby carriage at a second location of the scene before a simulation is initiated. Each of the objects evaluated for radar reflections in a simulation may be referred to as a "reference" object, an "identified" object, a "selected" object, a "tracked" object," or a "machine-learning" object.

Scenario data 150 may include data that adjusts scenes according to specific criteria before a simulation is run or when a simulation is run. Scenario data 150 may identify a type of weather that should be associated with a particular scene or changing conditions that may be associated with a simulation. In an instance when a scene includes a vehicle driving down a two-lane roadway during a simulation that approximates radar energy reflected off of a set of objects over a scene-scenario that spans some amount of time (e.g. seconds, tens of seconds, or other), a first simulation could be performed under nominal conditions. Here again this simulation may include multiple scenes that are each have a start time and an end time.

Later, the same scene-scenario may be used to generate simulated reflected radar data off the same set of objects after an anomaly has been added to the scene. Such an anomaly may include a passing vehicle that generates a spray of water based on that passing vehicle driving though a mass of water on the roadway. In another instance, scenario data may identify a change in a type of weather to associate with a particular scene (e.g. rain, snow, ice, or fog).

The data stored in object datastore 120, scene datastore 130, scenario augmentation datastore 140, and the scenario data 150 may be used to generate data associated with the movement of objects in a scene that may be stored in data structure. As mentioned above such a data structure may be referred to as a bounding volume hierarchy (BVH) that stores BVH data. This BVH data may be similar to the data discussed with respect to table 1, where object data is associated with start and end locations for each of timeframe of a simulation for a given a scene-scenario. Here, each respective timeframe may correspond to a respective scene of the simulation. Scenario augmentation data 140 or scenario data 150 may be used to change how fast particular objects move in a scene, how fast a vehicle moved in a scene, or change other factors of the scene-scenario.

The speed of a vehicle, a person, or other object in the scene-scenario may be changed each time a simulation is run. Such changes in speed could affect relative locations of objects in the scene-scenario from one scene to another. This is because the faster or slower an object moves relative to a location where a simulated radar is located will affect object location data stored in a BVH. While for a given relative speed of an object that has a same starting location in a first scene, the ending location of that location at the end of a 10 ms scene will be different when the relative speed of the object changes from one simulation to another. Such a difference in speed would also affect start and end locations of each subsequent timeframe or scene of a scene-scenario.

Once objects and relative speeds of those objects that will be associated with a simulation are established, data of a BVH data structure may be populated with start and end locations for each object of a scene-scenario. A processor executing instructions out of a memory may split a scene into a set of times. This may allow the processor to interpolate a location of each "reference" object of the scene-scenario for each of the set of times within a scene. This allows the processor to simulate the transmission of a radar signal that reflects off of each of the "reference" objects during that scene. By limiting the simulation to only a limited number of "reference" objects as compared to simulating radar reflections associated with an entire scene, simulations may be rendered more quickly (using fewer computations).

The simulation may include simulating radar pulses and their reflections over one or many scenes and simulated radar reflection data may be provided to a machine learning apparatus to "teach" that apparatus to identify certain type of objects that may be encountered by an autonomous vehicle as that vehicle moves along a roadway. Using simulated radar data instead of actual radar data may allow a designer of a radar apparatus to more efficiently teach an artificial intelligence system to identify objects that are rarely encountered. This process could allow the designer to tune a radar apparatus using simulated data and possibly a few sets of real-world data instead of making the designer collect a large set of real-world data to train an artificial intelligence system.

Figure 2:
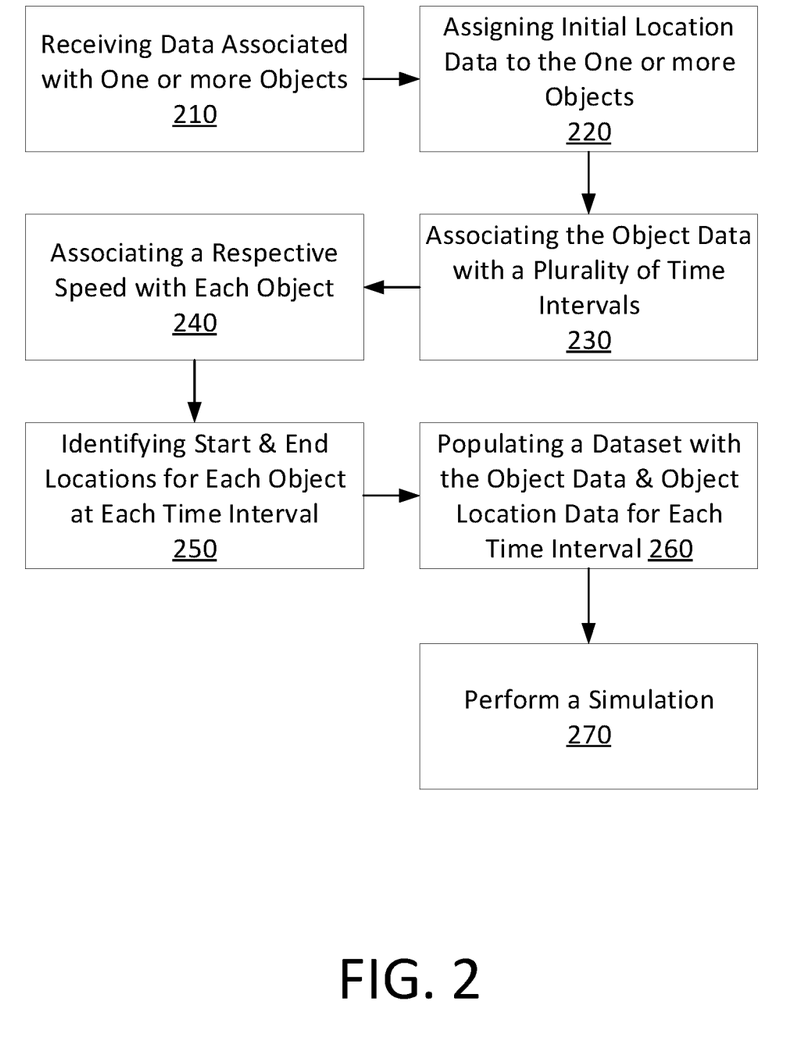
FIG. 2 includes a series of steps that may be performed when a simulation is being prepared to be performed, according to some aspects of the disclosed technology.

FIG. 2 includes a series of steps that may be performed when a simulation is being prepared to be performed. Step 210 of FIG. 2 is a step where data associated with one or more objects is received. This data may be received from the object datastore 120 of FIG. 1. Here again, the start and end locations may have been identified based on a velocity of the object. These start and end locations may be or may correspond to the start and end locations of a particular scene. Step 220 of FIG. 2 is a step where each object is assigned an initial location and in step 230 this object data may be associated with a plurality of timestamps/time intervals that correspond to one or more different scenes. Each timestamp may correspond to a start time or an end time of a specific scene. This data may include a start location and an end location of each of the objects identified in step 210.

Next at step 240 a speed may be associated with each identified object and then start and end locations for each object at each time interval may be identified in step 250. This start and end location data may be stored at step 260 of FIG. 2. This data may be stored in association with object identifying data in a data structure, such as the BVH discussed above. After the start and end locations are associated with each object or object parts, a simulation may be performed at step 270.

Figure 3:
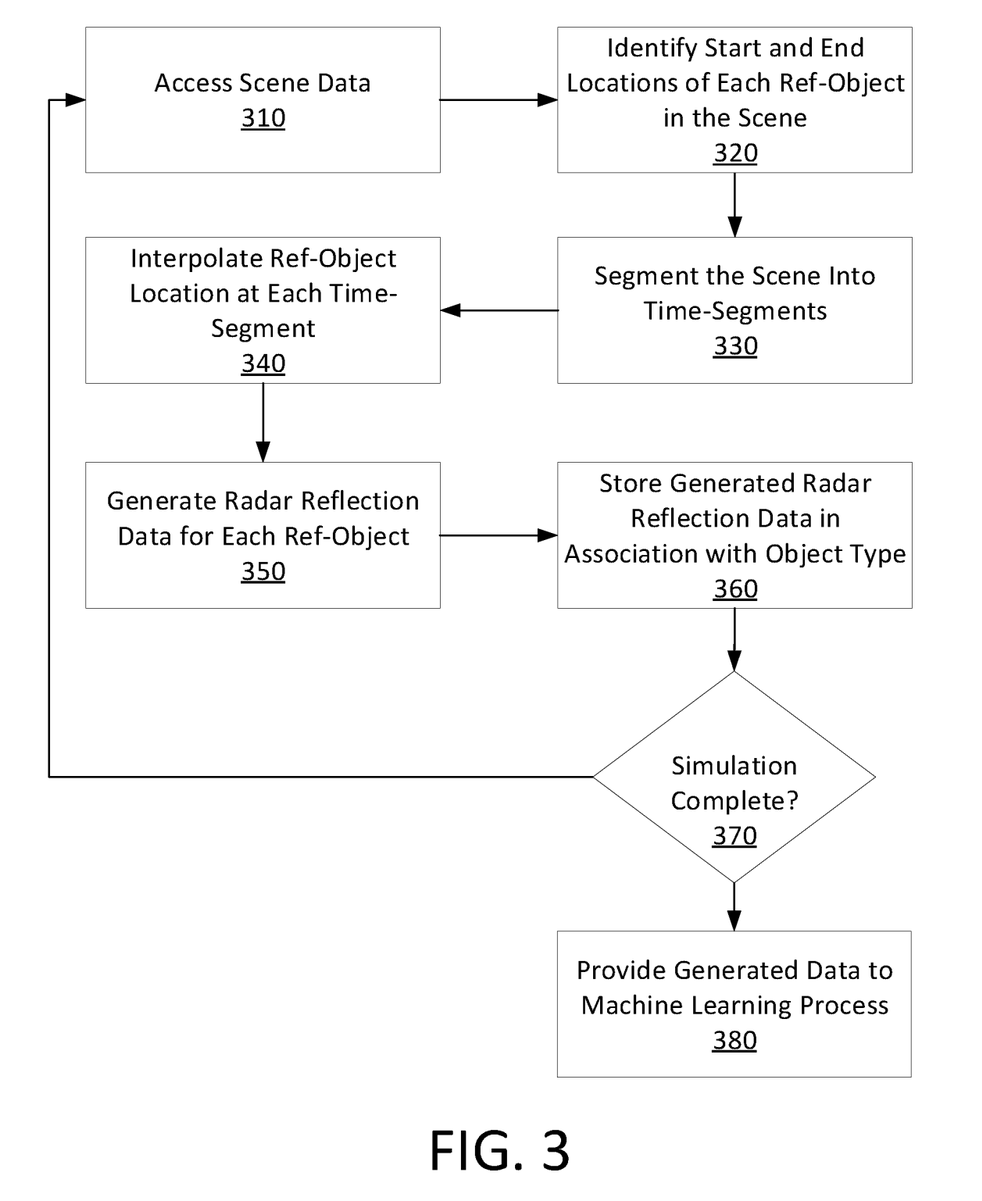
FIG. 3 illustrates a series of steps that may be performed by a simulation of the present disclosure.

FIG. 3 illustrates a series of steps that may be performed by a simulation of the present disclosure. Most of the steps of FIG. 3 may be performed for each scene of a scene-scenario (one or more scenes in a sequence of scenes). FIG. 3 begins with step 310 where scene data is accessed. The scene data accessed in step 310 may be the data included in table 1. Here the scene data may be the data populated in step 260 of FIG. 2. As mentioned above, this data may be stored in a data structure that may be referred to as a bounding volume hierarchy (BVH). This data may be a function of speeds of objects and original locations of objects that may be a function of one or more of real-world data, computer simulated data, user entered data, a set of reference object data, or other factors that may affect the location of reference objects in a series of scenes (or scene-scenario).

Next in step 320, for the present scene, a start and an end location of each object in the scene may be identified and then that scene may be segmented into time segments in step 330 of FIG. 3. Intermediate locations of each object may be interpolated in step 340 of FIG. 3. These interpolations may be identified using linear equations, non-linear equations that account for object rotation, or combinations of both linear and non-linear equations. These intermediate locations are locations for each respective time-segment where a reference object is located during a scene. These time-segments may be uniform periods of time that occur between the start location and the end location of a scene. In an instance when a scene spans 10 milliseconds (ms), time segments associated with each of the scenes may be set a 1 ms. In such an instance, a first scene of a scene-scenario may begin at 0 ms and end at 10 ms. Here times of each of the time-segments between 0 ms & 10 ms would correspond to 1 ms, 2 ms, 3 ms, 4 ms, 5 ms, 6 ms, 7 ms, 8 ms, & 9 ms.

Once the interpolated locations are identified, simulations of reflected radar data may be generated for each reference object at each of the start time, at each time-segment, and at the end time in step 350 of FIG. 3. This may result in sets of reflection data being generated that may be characteristic of reflections of a radar signal off of one or more of the reference objects. This simulation may include the simulation of a radar signal, beam, or ray that includes a series of pulses over a span of time. This span of time could be the same time span as a single scene of the simulation, or this span of time could have another duration. The simulated radar signal may be emitted from a simulated radar apparatus of an autonomous vehicle. This simulation may also simulate patterns of reflected radar energy from the reference objects that would be received by the radar apparatus of the autonomous vehicle.

The simulations discussed herein may be performed at the pulse level and may be directed to measuring reflections of radar signals off of a whole shape of an object or off of parts of that object. By segmenting time stamps (start times & end times) of a scene into different intermediate time-segments and interpolated locations, simulations of the present disclosure allow for data to be generated to represent movement of particular objects even when precise locations of the object between the start time and the end time were not measured or previously identified.

The radar reflection data generated by the simulation may be stored in step 360 of FIG. 3. In certain instances, this data may be stored in association with an identified that identifies an object type. For example, when a portion of the reflected data is associated with a person riding a bicycle, that portion of the data could be stored with an identifier that identifies the fact that this particular set of data represents a radar signature of a person riding a bicycle.

Type of simulated radar signals emitted and received may be associated with a type of radar and a type of radar analysis. For example, a radar may emit a series of 100 pulses over the span of 1 ms and simulated reflected data may be in the form of a shift in period (i.e. a Doppler shift) of the emitted radar signal. Here the shift in time period of the reflected radar signal will correspond to a relative difference in speed of the radar apparatus and the object when the object moves in a direction toward or away from the radar apparatus.

Certain sets of reflected data may be associated with a rotation of an object. This may be especially true when an object includes multiple parts that may move independently in some respect. For example, a front end and a rear end of a car could be considered different parts of the car, and differences in Doppler shift between radar reflecting off of the front end of the car and the rear end of the car could be used to identify that the car is rotating, perhaps in an unusual way. For example, the car could have impacted an unseen object that forced that car to rotate in an unusual way. This rotation would be indicated by a difference in relative velocities of the front end of the car and the rear end of the car.

After step 360, program flow could move to determination step 370 that identifies whether the simulation is complete. This determination may evaluate whether a BVH stores additional scene data that has not yet already been used in a simulation. When determination step 370 identifies that the simulation is not complete, program flow may move back to step 310 were data from an additional or next scene may be accessed.

When determination step 370 identifies that the simulation is complete, program flow may move to step 380 where the simulation data generated in step 350 and stored in step 360 is provided to a machine learning (ML) process or artificial intelligent (AI) system. This ML process or AI system may then use this data to learn to identify radar signatures associated with certain types of objects that may have moved in certain ways. These ML processes or AI systems may then generate queues that allow these processes or systems to identify objects based entirely on or mostly on one or more sets of simulated data.

Figure 4:
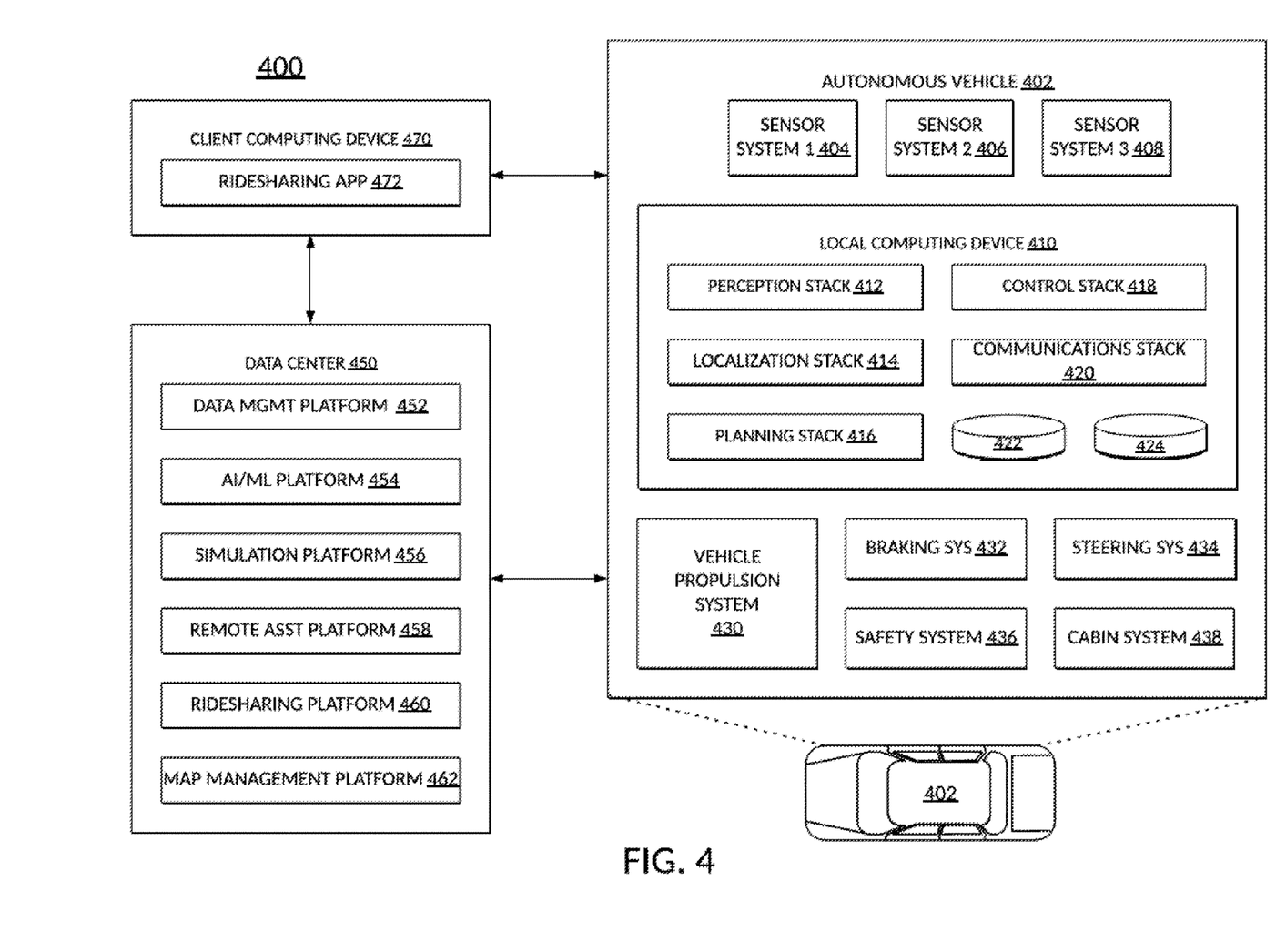
FIG. 4 illustrates an example system environment that can be used to facilitate AV dispatch and operations, according to some aspects of the disclosed technology.

FIG. 4 illustrates an example system environment that can be used to facilitate AV dispatch and operations, according to some aspects of the disclosed technology. FIG. 4 illustrates an example of an AV management system 500 of FIG. 5. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, brake pads, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an HD geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data as discussed further below with respect to FIG. 2 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, a ridesharing platform 460, and map management system platform 462, among other systems.

Data management platform 452 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management system platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management system platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management system platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management system platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, UAVs, satellites, third-party mapping services, and other sources of geospatially referenced data. The raw data can be processed, and map management system platform 462 can render base representations (e.g., tiles (2D), bounding volumes (3D), etc.) of the AV geospatial data to enable users to view, query, label, edit, and otherwise interact with the data. Map management system platform 462 can manage workflows and tasks for operating on the AV geospatial data. Map management system platform 462 can control access to the AV geospatial data, including granting or limiting access to the AV geospatial data based on user-based, role-based, group-based, task-based, and other attribute-based access control mechanisms. Map management system platform 462 can provide version control for the AV geospatial data, such as to track specific changes that (human or machine) map editors have made to the data and to revert changes when necessary. Map management system platform 462 can administer release management of the AV geospatial data, including distributing suitable iterations of the data to different users, computing devices, AVs, and other consumers of HD maps. Map management system platform 462 can provide analytics regarding the AV geospatial data and related data, such as to generate insights relating to the throughput and quality of mapping tasks.

In some embodiments, the map viewing services of map management system platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit in route to a pick-up or drop-off location, and so on.

Figure 5:
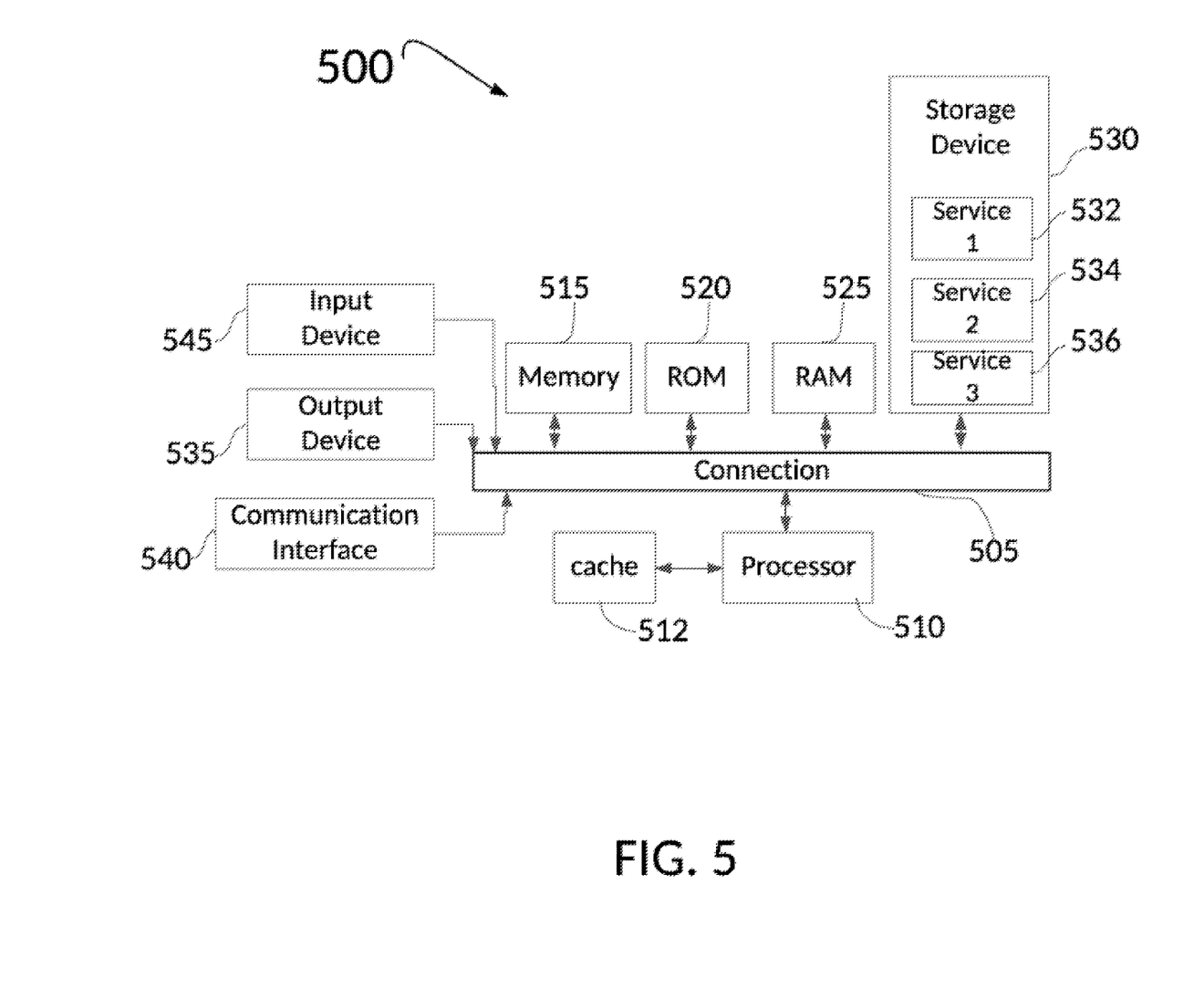
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up internal computing system 510, remote computing system 550, a passenger device executing the rideshare app 570, internal computing device 530, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510.

Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method, comprising:
accessing data that associates a first scene with a start time and an end time of the first scene and that associates each respective object of a set of objects in the first scene with a respective starting location and a respective ending location;
generating simulated radar data for each of the set of objects at the start time based on simulated radar energy being reflected off of each of the objects in the set of objects at each of the respective starting locations;
calculating interpolated positions of movement of a first object in the set of objects from the start time to the end time based on an identification that the first object has moved in the first scene from a start location to an end location of the first object, wherein each of the interpolated positions of the movement of the first object are associated with a respective interpolated location of the first object from the start location and the end location of the first object;
generating simulated movement radar data associated with the movement of the first object at each of the interpolated positions; and
generating simulated radar data for each of the objects in the set of objects inclusive of the first object at the end time based on simulated energy being reflected off of each of the objects in the set of objects at each of the respective ending locations.

2. The computer-implemented method of claim 1, further comprising:
identifying that a second object of the set of objects has moved in the first scene between the start time and the end time; and
calculating interpolated positions of motion of the second object from the start time to the end time, wherein the generated simulated radar data is also generated based on the motion of the second object.

3. The computer implemented method of claim 1, further comprising associating the first object with a plurality of boxes that represent a part of the first object.

4. The computer implemented method of claim 3, wherein the plurality of boxes include a first box that corresponds to a torso of a person and a second box that corresponds to an appendage of the person.

5. The computer implemented method of claim 1, further comprising:
accessing data associated with a second scene that begins at the start time of the second scene and that ends at an end time of the second scene, wherein the start time of the second scene corresponds to the end time of the first scene;
identifying that the first object has moved between the start time and end time of the second scene; and
calculating interpolated position of movement of the first object from the start time of the second scene to the end time of the second scene, wherein the generated simulated movement radar data is also associated with the movement of the first object from the start and end times of the second scene.

6. The computer implemented method of claim 1, further comprising receiving motion data of a computer model approximates the movement of the first object.

7. The computer implemented method of claim 6, wherein the motion data is associated with the first object moving in a direction that affects a Doppler shift of simulated radar signals.

8. The computer implemented method of claim 6, wherein the motion data of the computer model includes a representation of rotation of the first object based on the motion data being associated with a first box that corresponds to a first part of the first object and a box that corresponds to a second part.

9. The computer implemented method of claim 8, wherein changes in relative locations of the first part of the first object and the second part of the first object between the start time and the end time of the first scene correspond to the rotation of the first object.

10. The computer implemented method of claim 1, further comprising:
receiving data that changes a relative speed of the first object; and
generating simulated radar data for motion data associated with the changed relative speed of the first object.

11. The computer implemented method of claim 1, further comprising:
receiving data that changes the start location of the first object; and
generating simulated radar data for motion data associated with the changed start location of the first object.

12. The computer implemented method of claim 1, wherein the simulated movement radar data of the first object is provided to train the machine learning apparatus.

13. A non-transitory computer-readable storage medium for implementing a computer implemented method for collecting data for training a machine learning apparatus, the computer implemented method comprising:
accessing data that associates a first scene with a start time and an end time of the first scene and that associates each respective object of a set of objects in the first scene with a respective starting location and a respective ending location;
generating simulated radar data for each of the set of objects at the start time based on simulated radar energy being reflected off of each of the objects in the set of objects at each of the respective starting locations;
calculating interpolated positions of movement of a first object in the set of objects from the start time to the end time based on an identification that the first object has moved in the first scene from a start location to an end location of the first object, wherein each of the interpolated positions of the movement of the first object are associated with a respective interpolated location of the first object from the start location and the end location of the first object;
generating simulated movement radar data associated with the movement of the first object at each of the interpolated positions; and
generating simulated radar data for each of the objects in the set of objects inclusive of the first object at the end time based on simulated energy being reflected off of each of the objects in the set of objects at each of the respective ending locations.

14. The non-transitory computer-readable storage medium of claim 13, the program further executable to:
identify that a second object of the set of objects has moved in the first scene between the start time and the end time; and
calculate interpolated positions of motion of the second object from the start time to the end time, wherein the generated simulated radar data is also generated based on the motion of the second object.

15. The non-transitory computer-readable storage medium of claim 13, the program further executable to associate the first object with a plurality of boxes that represent a part of the first object.

16. The non-transitory computer-readable storage medium of claim 15, wherein the plurality of boxes include a first box that corresponds to a torso of a person and a second box that corresponds to an appendage of the person.

17. The non-transitory computer-readable storage medium of claim 13, the program further executable to:
access data associated with a second scene that begins at the start time of the second scene and that ends at an end time of the second scene, wherein the start time of the second scene corresponds to the end time of the first scene;
identify that the first object has moved between the start time and end time of the second scene; and
calculate interpolated position of movement of the first object from the start time of the second scene to the end time of the second scene, wherein the generated simulated movement radar data is also associated with the movement of the first object from the start and end times of the second scene.

18. The non-transitory computer-readable storage medium of claim 13, the program further executable to receive motion data of a computer model approximates the movement of the first object.

19. The non-transitory computer-readable storage medium of claim 18, wherein the motion data is associated with the first object moving in a direction that affects a Doppler shift of simulated radar signals.

20. The non-transitory computer-readable storage medium of claim 18, wherein the motion data of the computer model includes a representation of rotation of the first object based on the motion data being associated with a first box that corresponds to a first part of the first object and a box that corresponds to a second part.

21. An apparatus for collecting data for training a machine learning apparatus, the apparatus comprising:
a data store that stores data that associates a first scene with a start time and an end time of the first scene, and that associates each respective object of a set of objects in the first scene with a respective starting location and a respective ending location;
a memory;
and a processor that executes instructions out of the memory to:
generate simulated radar data for each of the respective objects at the start time based on simulated radar energy being reflected off of each of the respective objects at each of the respective starting locations,
calculate interpolated positions of movement of a first object from the start time to the end time based on an identification that the first object has moved in the first scene from a start location to an end location of the first object, wherein each of the interpolated positions of the movement of the first object are associated with a respective interpolated location of the first object from the start location and the end location of the first object,
generate simulated movement radar data associated with the movement of the first object at each of the interpolated positions, and
generate simulated radar data for each of the respective objects inclusive of the first object at the end time based on simulated energy being reflected off of each of the respective objects at each of the respective ending locations wherein the simulated movement radar data of the first object is provided to train the machine learning apparatus.

* * * * *